Figure 1:
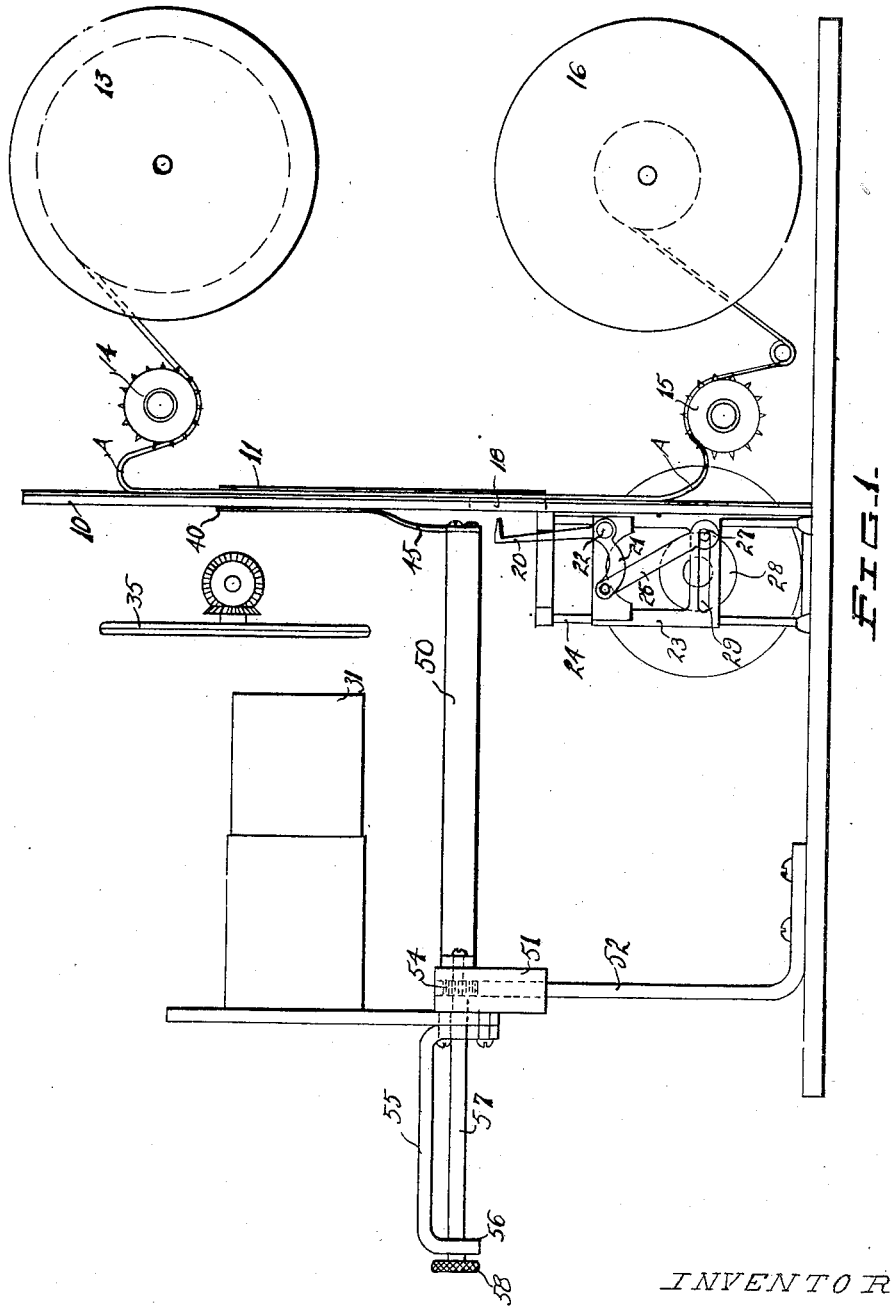

W. PARKES.
FRAMING DEVICE FOR MOTION PICTURE MACHINES.
APPLICATION FILED JAN. 10, 1918.

INVENTOR,
Walter Parkes,
BY Baker Macklin,
ATT'YS.

W. PARKES.
FRAMING DEVICE FOR MOTION PICTURE MACHINES.
APPLICATION FILED JAN. 10, 1918.

1,335,749.

Patented Apr. 6, 1920.
2 SHEETS—SHEET 2.

INVENTOR,
Walter Parkes
BY Baker & Macklin
ATTYS.

UNITED STATES PATENT OFFICE.

WALTER PARKES, OF CLEVELAND, OHIO, ASSIGNOR, BY MESNE ASSIGNMENTS, TO HENRY C. OSBORN, OF CLEVELAND, OHIO.

FRAMING DEVICE FOR MOTION-PICTURE MACHINES.

1,335,749.      Specification of Letters Patent.      Patented Apr. 6, 1920.

Application filed January 10, 1918. Serial No. 211,119.

*To all whom it may concern:*

Be it known that I, WALTER PARKES, residing at Cleveland, in the county of Cuyahoga and State of Ohio, have invented a certain new and useful Improvement in Framing Devices for Motion-Picture Machines, of which the following is a full, clear, and exact description, reference being had to the accompanying drawings.

The object of this invention is to provide a very simple and readily adjustable device for properly "framing" a picture in a motion picture projector. As is well known in exhibiting motion pictures, the picture sometimes fails to register accurately with the exposure opening, due to different causes, as for example, inaccuracy in the taking camera, inaccurate piecing together of films, tearing of the feeding openings, etc. To provide for this it is desirable to have some means for changing the presentation of the effective exposure opening to the film during the progress of the latter in exhibiting the picture. One well known method has been to adjust up or down the entire intermittent feeding device. This is cumbersome and introduces complications into the feeding, and furthermore changes the presentation of the picture to the lens, which is liable to visibly disturb the view exhibited on the screen.

It is the object of my invention to provide a framing device which may accomplish the desired result with very simple mechanism, easily adjusted while the exhibition is in progress and without interfering with the visible picture. To this end I provide a special framing member connected with the lens and adjusted bodily up and down with the lens, this framing member taking the place, for effect, of the opening in the film guiding plate. Other characteristics of my invention are apparent in the following more detailed description of an improved embodiment thereof shown in the drawings.

Figure 2:
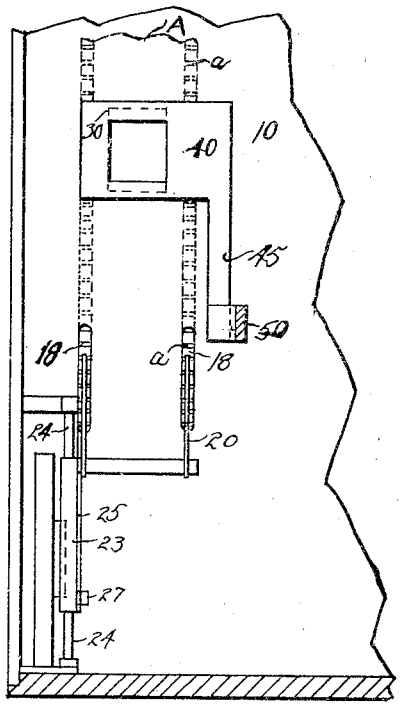
Figure 4:
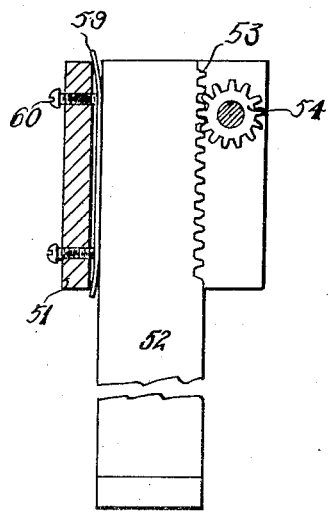
Figure 3:
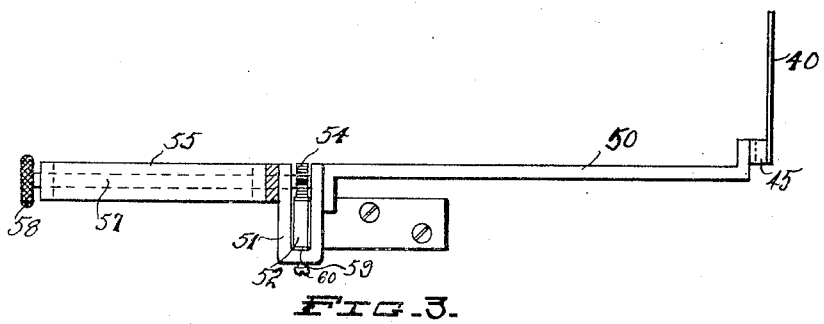

In the drawings, Figure 1 is a side elevation of my framing device and so much of a motion picture projecting apparatus as directly coöperates therewith; Fig. 2 is a vertical section behind the lens and shutter; Fig. 3 is a plan of my adjustable framing device; Fig. 4 is a detail of the rack and pinion shown for effecting the adjustment, being an enlarged sectional elevation.

In Figs. 1 and 2, 10 indicates an upright stationary film guiding plate. 11 is a spring pressed plate or gate coöperating therewith to guide the film A between them. The film comes from an upper supply reel 13 across a feed roller 14 and goes from the vertical guide across a roller 15 to a reel 16 with the usual loops between these feeding devices and the vertical plate.

The intermediate feeding device is preferably a claw mechanism which has a pair of prongs acting through vertical openings 18 in the plate 10 and engaging openings *a* in the film. The claw mechanism shown in Figs. 1 and 2 is simply by way of illustration and is not claimed herein but in my prior application No. 181,943, filed July 21, 1917. As shown, it consists of a pair of pronged members 20 carried by a rock shaft 22 and which is mounted in a reciprocating carriage 23 slidable on stationary guide bars 24. A rock arm 21 from the shaft 22 is connected by a pitman 26 with the crank pin 27 of the driving crank 28. This pin extends through a slot 29 in the carriage.

It results from the described construction, that as the crank is rotated the carriage is reciprocated up and down and the pitman swings the claws into and out of engagement with the film. The engagement takes place at the upper end of the stroke, and the release at the lower end. This is more fully described in the application referred to.

In Figs. 1 and 2, 30 indicates an exposure aperture through the film guiding plate and 31 indicates the tube carrying the lens. Instead of making the aperture the exact size of the picture and relying on it to frame the picture, I make its vertical dimension considerably greater than that of the picture and I supply on the front side of the plate 10 a special gate 40, the aperture of which is just the size of the picture. This gate lies between the film plate and the shutter 35. It is carried rigidly with the lens carrier, as by the bar 50, and the two are adjustable up and down as a unit so that the picture may be properly framed without disturbing the film guiding plate or the feeding mechanism.

The adjustment of the gate 40 is of course only a small fraction of an inch, and as the lens tube is rigid on the bar 50 and adjusted up and down with the gate, the displacement of the picture on the screen is not multiplied, but amounts only to this same small fraction, which is accordingly unobservable to the spectators.

As will be seen from Figs. 1 and 3, the lens carrier 31 and the frame 40 are both rigidly secured to a horizontal bar 50 which is shown as provided with a housing 51 embracing a vertical standard 52. The vertical standard 52 is suitably supported at its front and has rack teeth 53 on its vertical edge, and in the housing is a rotatable pinion 54 meshing with the rack teeth. Suitable means are provided for rotating the pinion to raise or lower the housing, bar, lens-carrier and frame as a unit. As shown, a bar 55 extends forwardly from the housing and has a downwardly turned ear 56 in which is journaled a shaft 57 connected with the pinion. A knob 58 on the forward end of the shaft provides means for turning it. A spring 59 in the housing adjusted by screws 60 maintains tight engagement and provides sufficient friction so that the parts will hold whatever position they are given by the knob 58.

The sight window of the frame 40, as stated, is dimensioned according to the dimensions of the picture. The material of the frame above and below the opening are of sufficient size to cover the balance of the opening 30 through the film plate irrespective of the position of the frame. To support the frame without interfering with the intermittent feed, I find it very convenient to extend downwardly an arm which is connected to the horizontal bar 50. As shown in the drawing, the frame and its supporting arm 45 are made of sheet metal which enables sufficient spring to allow the frame to lie snugly along the front face of the film guiding plate.

Such a device as described properly frames the picture without disturbing the intermittent feed or interrupting the view on the screen. Further advantages consist of the simplicity of the device and the ease with which it may be installed or removed and operated when in place.

Having thus described my invention, what I claim is:

1. The combination of a film guide having an opening, a member vertically adjustable relative to said opening, a framing plate spring pressed against said film guide, said framing plate having a downwardly extending arm secured to said member, and a lens carrier also supported by said member in axial alinement with the center of the opening in the framing plate.

2. The combination of a film guide, a lens carrier, a frame between the lens carrier and film guide, a horizontal bar rigidly connected with both the frame and lens carrier, a standard supporting the bar, rack teeth on the standard, a pinion carried by the bar in mesh with the rack teeth, and means carried by the bar for rotating the pinion.

3. In a device of the character described, the combination, with a film guide, of a lens carrier, a frame for the picture consisting of a thin plate having a spring pressure against the film guide, a bar to which the spring plate is secured at its lower end, the upper end of the plate being free, the lens carrier being also secured to said bar, and means for adjusting the bar up and down.

In testimony whereof, I hereunto affix my signature.

WALTER PARKES.